US009578106B2

(12) United States Patent
Brunson et al.

(10) Patent No.: US 9,578,106 B2
(45) Date of Patent: Feb. 21, 2017

(54) SYSTEM AND METHOD FOR BINDING A VIRTUAL DESKTOP INFRASTRUCTURE HOST AND MEDIA SOFT CLIENT TOGETHER

(71) Applicant: Avaya Inc., Santa Clara, CA (US)

(72) Inventors: Gordon R. Brunson, Broomfield, CO (US); Gregory D. Weber, Westminster, CO (US)

(73) Assignee: Avaya Inc., Santa Clara, CA (US)

( * ) Notice: Subject to any disclaimer, the term of this patent is extended or adjusted under 35 U.S.C. 154(b) by 208 days.

(21) Appl. No.: 14/594,755

(22) Filed: Jan. 12, 2015

(65) Prior Publication Data
US 2015/0244812 A1 Aug. 27, 2015

Related U.S. Application Data

(60) Provisional application No. 61/944,968, filed on Feb. 26, 2014.

(51) Int. Cl.
| G06F 15/16 | (2006.01) |
| H04L 29/08 | (2006.01) |
| G06F 9/455 | (2006.01) |
| G06F 9/44 | (2006.01) |
| H04L 29/06 | (2006.01) |

(52) U.S. Cl.
CPC .......... *H04L 67/141* (2013.01); *G06F 9/4445* (2013.01); *G06F 9/45533* (2013.01); *H04L 67/10* (2013.01); *H04L 67/42* (2013.01)

(58) Field of Classification Search
CPC ......... H04L 67/141; G06Q 10/10; G06F 3/14; G06F 17/30557
USPC .................................. 709/203, 231; 345/611
See application file for complete search history.

(56) References Cited

U.S. PATENT DOCUMENTS

| 9,348,552 | B2* | 5/2016 | Friedl ....................... G06F 3/14 |
| 2010/0296417 | A1 | 11/2010 | Steiner | |
| 2012/0218374 | A1 | 8/2012 | Matula et al. | |
| 2013/0120455 | A1* | 5/2013 | Friedl ....................... G06F 3/14 |
| | | | | 345/638 |
| 2013/0148493 | A1 | 6/2013 | Keenan et al. | |
| 2013/0212286 | A1* | 8/2013 | Krishnakumar ...... H04L 67/148 |
| | | | | 709/227 |
| 2015/0215624 | A1* | 7/2015 | Wei ....................... H04N 19/136 |
| | | | | 715/740 |

* cited by examiner

*Primary Examiner* — Frantz Jean
(74) *Attorney, Agent, or Firm* — Sheridan Ross P.C.

(57) ABSTRACT

Methods and systems are provided that utilize the functionality of an end user device in binding a virtual desktop infrastructure (VDI) media client on an end user device with a VDI host client on a VDI server. In particular, the native operating system (OS) on the end user device may take a screen-shot of a quick response (QR) code displayed to a graphical user interface of the end user device. The end user device may provide information associated with the screen-shot of the QR code to a collaboration server where the collaboration server binds the VDI media client together with the VDI host client upon verifying the information associated with the screen-shot of the QR code.

20 Claims, 5 Drawing Sheets

SYSTEM AND METHOD FOR BINDING A VIRTUAL DESKTOP INFRASTRUCTURE HOST AND MEDIA SOFT CLIENT TOGETHER

FIELD OF THE DISCLOSURE

The present disclosure is generally directed toward virtual desktop infrastructure/integration architecture and more specifically toward binding virtual desktop infrastructure hosts and media clients.

BACKGROUND

Recently, contact centers have begun employing the use of virtual desktop infrastructure (VDI) solutions to reduce the costs associated with desktop phones, systems, and equipment. In addition to the equipment cost, traditional phone systems require a multitude of physical and organizational structures and facilities to maintain operations. These structures and facilities can require constant maintenance and support. In general, VDI solutions provide virtualized desktop operating systems and applications to reduce costs, simplify deployment, and enhance support and manageability for end users and administrators. VDI can provide the virtual desktop to a low-cost virtual desktop device while providing the processing power of the desktop in the network. Additionally, VDI also provides other benefits including security of information and backup services.

In today's environment, the virtual desktop may include a variety of media services, such as voice communications, video communications, text communications, and more. Communications for these media services can be provided via the VDI desktop. As can be appreciated, contact center servers may have difficulty in supporting real-time communications through VDI. In general, VDI environments are not architected to easily support bi-directional real time streaming communications. Moreover, if connectivity to a contact center is lost while providing media communications through contact center supported VDI, those communications would be lost along with the connection.

Enabling unified communications through specialized software for VDI desktops can eliminate the desktop phone and provide users with advanced communications capabilities. One example of this specialized software is Avaya's VDI Communicator. The specialized software may be deployed on a thin client device. A thin client device is the end user's equipment that is used to provide plug-in ports for a monitor, keyboard, mouse, headset, and connectivity to a network. The specialized software allows the separation of media traffic from signaling traffic such that media traffic no longer flows through the contact center servers. As such, if connectivity to the contact center server is lost, the media traffic is not. This feature of the specialized software allows end users to continue to make and receive calls even during server connectivity failures.

In the specialized software case provided above, two soft clients are involved in implementing the VDI solution. For instance, one soft client may be run within the VDI host environment (e.g., contact center server, remote server, etc.) to perform the signaling functionality. This soft client is called the VDI Host client, and provides the GUI interface for the softphone. The other soft client is run natively on the end user's device (e.g., computer, etc.) to perform the media functionality, and is called the VDI Media client, since it handles capturing and rendering the media streams to and from I/O devices, but does not generally display the GUI components associated with a full softphone client. To provide unified communications via the specialized software the two soft clients need to be bound together. In some cases, where the operating system and the VDI environment belong to the same developer, binding the two soft clients can be achieved via use of a developer proprietary communications protocol and information exchange. However, where the operating system and the VDI environment are owned by different developers a user must login to each soft client individually to essentially bind the two soft clients.

SUMMARY

It is with respect to the above issues and other problems that the embodiments presented herein were contemplated. In general, embodiments of the present disclosure provide methods, devices, and systems that utilize the functionality of an end user's device to retrieve a binding code provided by the VDI Host client. For example, the VDI Media client running natively on a computer (i.e., native client) may take a screen-shot of a quick response (QR) code displayed to the computer by the display of the VDI Host client. When the native client captures the QR code, the native client may provide the QR code to the server to initiate the binding of the VDI Media client with the VDI Host client. Among other things, this approach leverages the power of an operating system's screen-capture functionality and the information contained in the machine readable QR code. It should be appreciated that the terms image-capture, screen-capture, screen-shot, and the like may be used interchangeably throughout this disclosure.

In some embodiments, an end user's native device running a VDI Media client may establish a virtual machine window and connection to a VDI server to provide the services of a virtual operating system to the client device. Within this virtual machine window, the user may launch (among other applications) a VDI Host client application providing the graphical user interface (GUI) interface for a multimedia softphone. The VDI Host client may provide a QR code in its display that may be captured by the VDI Media client on the end user's device. It should be appreciated that the QR code does not necessarily have to actually (or physically) display to a screen associated with the end user's device in order for this process to function. For example, the QR code may be written to a device driver within the "sandbox" assigned to the Virtual Machine Window in the native device's operating system where it may be captured by the VDI Media client by reading the code out of the device driver. One advantage of using the QR code directly on the screen, however, is that no driver modifications are required to the native operating system of the device.

The VDI Media client may not yet know that the QR code is available to be captured, but the VDI Host client will initiate a registration and binding request to one or more Collaboration Server(s) through the VDI Server. Among other things, the Collaboration Server(s) may be responsible for Session Initiation Protocol (SIP) registration and/or proxy routing. Upon receiving the binding request, the Collaboration Server may begin a progressive broadcast search to find the VDI Media client that will capture its screen, detect a QR code if it exists, and return information from the QR code that can be compared by the Collaboration Server to the binding request to prove that it has captured the exact QR code that is being displayed by the VDI Host client that initiated the binding request. The progressive broadcast search may begin with an attempt to contact the lastsuccessfully-bound VDI Media client, then proceed to contact nearby VDI Media clients according to network proximity or assigned user home locations, and then contact any available VDI Media client in the network. In some embodiments, only devices containing unbound VDI Media clients may be contacted in the broadcast search.

Any unbound VDI Media client that receives a bind broadcast request is expected to capture its screen, search for a possible QR code (among other techniques), and return correlation information extracted from the QR code to the Collaboration Server. Screen-capture functionality is available with most computer operating systems. The screen-capture via the end user's device can record an image of the provided QR code. In some embodiments, the QR code may contain a unique random correlation code which is the minimum amount of information required to support the binding operation. In yet other embodiments, the QR code may also contain unique binding information that can be interpreted via the VDI Media client on the end user's device. Among other things, the binding information may include, but is in no way limited to, communications information, addresses, ports, locations, routes, identification information, combinations thereof and/or the like. In one embodiment, the VDI Media client may provide all the binding information to the Collaboration Server. In another embodiment, the VDI Media client may return only the correlation code. In any event, the Collaboration Server may receive the binding information and/or screen-captured QR code to compare against the original bind request received from the VDI host client.

In some embodiments, an end user may have multiple windows open, or displayed, by a device. As can be appreciated, multiple windows may overlap and/or otherwise obscure a QR code provided via the VDI Host client. It is an aspect of the present disclosure that the screen-capture command may be preceded by a window arrangement, or focus selection, command. For example, upon receiving a broadcast binding request, a VDI Media client may attempt to find and give priority to displaying a local Virtual Machine Window in the native OS collection of windows. In another example, a warning message may be provided that instructs an end user to close and/or minimize other (non-VDI) windows if a conflict with the (VDI) media soft client window is detected. Additionally or alternatively, an operating system associated with the end user's device may be caused to perform a specific window image-capture. This specific window capture may be used instead of an overall screen capture where the application programming interface of the operating system provides for this functionality.

In performing an initial binding a Collaboration Server may broadcast to all registered unbound native clients to perform a binding operation as provided herein. Once an initial binding match has been found, additional steps may be implemented to guarantee that a correct binding is achieved under all conditions, and protecting the binding from any attempt at a replay attack. Embodiments of the binding process disclosed herein may be used to provide security checking and/or validation. For instance, the Collaboration Server may implement periodic security checks that present a QR code via the VDI Host client and in response the native client may reaffirm the binding by repeating the QR code process as provided herein. The periodic security check may present the same or a different QR code based on security rules and/or policies.

In some embodiments, the binding between clients may be valid only for a specific period of time. Upon expiration of the specific period of time, the binding between the two soft clients may be terminated. This termination may be caused automatically by the expiration of the time period. Additionally or alternatively, prior to, during, or after the expiration of the specific time period, the VDI Host client may present a renewal QR code to renew the binding between the two clients. In one embodiment, a binding may be caused to initiate the renewal process upon detecting inactivity over a period of time. The inactivity may be associated with an end user at a communications device.

Client bindings established via the use of the various processes provided herein may be tracked and/or monitored by a processor and memory associated with the server. Among other things, tracking the client bindings may provide valuable data for recording work time, rest time, idle time, connectivity issues, and the like. For example, an end user may bind the VDI Host client with the VDI Media client at a first time of the day. As time passes, the end user may experience a connection issue (e.g., lost connection) with the server and the VDI Host client. While still logged into the VDI Media client, the user may attempt to reestablish the connection with the VDI Host client. In one embodiment, if attempts to reestablish the server connection are unsuccessful, the end user may contact support via the client device for assistance (e.g., when the entire VDI environment fails, etc.). Once the connection is reestablished, the end user may bind the VDI Host client with the VDI Media client via one or more of the screen-capture and QR code processes disclosed herein. Continuing this example, each time an end user binds the two clients together, the data surrounding the binding may be recorded. It is anticipated that this data may be analyzed to determine trends, reliability, predict busy times, predict availability, and more.

Embodiments include a method, comprising: receiving, at a server, enrollment information associated with a virtual desktop infrastructure (VDI) media client of an end user device across a communication network; determining, by at least one processor of the server, that the VDI media client of the end user device is not bound together with a VDI host client; providing a graphical binding code instruction to the VDI media client of the end user device; receiving, at the server, information associated with a captured image of a graphical binding code; determining, by the at least one processor of the server, whether the received information associated with the captured image of the graphical binding code allows for binding; and binding, via the server and in response to determining that the received information associated with the captured image of the graphical binding code allows for binding, the VDI media client of the end user device together with the VDI host client. Aspects of the above method include wherein the graphical binding code instruction is at least partially configured to present the graphical binding code to an application window of a graphical user interface associated with the end user device. Aspects of the above method include wherein the enrollment information associated with the VDI media client of the end user device includes a binding code associated with an end user identification and password. Aspects of the above method include wherein VDI communications are separated into a media traffic channel and a signaling traffic channel, and wherein the VDI media client is configured to accommodate the media traffic channel and the VDI host client is configured to accommodate the signaling traffic. Aspects of the above method include wherein the graphical binding code is at least one of a quick response (QR) code, a barcode, a matrix barcode, and a machine-readable representation of data used to bind the VDI media client with the VDI host client. Aspects of the above method include wherein prior to receiving the captured image of the graphical binding code, the method further comprises: initiating an image capture function of the end user device; and capturing an image of the presented graphical binding code. Aspects of the above method include wherein prior to capturing the image of the presented graphical binding code, the method further comprises: determining an arrangement of one or more windows presented to the graphical user interface of the end user device; providing an instruction to arrange the one or more windows when it is determined that the presented graphical binding code of the application window is not completely visible; and arranging, in response to the instruction, the one or more windows such that the graphical binding code is completely visible on the graphical user interface. Aspects of the above method include wherein capturing the image of the presented graphical binding code further comprises: receiving an instruction at the end user device to perform an image capture of at least a portion of the graphical user interface, wherein the image capture is performed by an operating system of the end user device; and storing the captured image in a memory associated with the end user device. Aspects of the above method include wherein determining whether the received information associated with the captured image of the graphical binding code allows for binding further comprises: reading, by the server, the information associated with the captured image of the graphical binding code; determining, by the server, whether a match exists between the read information associated with the captured image of the graphical binding code and data stored in a server memory; and allowing, by the server and where a match exists, for binding between the VDI media client and the VDI host client. Aspects of the above method include receiving, at the server, an input to affirm the binding between the VDI media client and the VDI host client bound together; providing a subsequent graphical binding code instruction to the end user device, wherein the subsequent graphical binding code instruction is at least partially configured to present a subsequent graphical binding code to the application window of the graphical user interface associated with the end user device; receiving, at the server, information associated with a captured image of the subsequent graphical binding code; and determining, at the server, whether the binding of the VDI media client and the VDI host client is affirmed based on the received information associated with captured image of the subsequent graphical binding code.

Embodiments include a non-transitory computer readable medium having stored thereon instructions that, when executed by a processor, perform a method comprising: receiving, at a server, enrollment information associated with a virtual desktop infrastructure (VDI) media client of an end user device across a communication network; determining, by at least one processor of the server, that the VDI media client of the end user device is not bound together with a VDI host client; providing a graphical binding code instruction to the VDI media client of the end user device; receiving, at the server, information associated with a captured image of a graphical binding code; determining, by the at least one processor of the server, whether the received information associated with the captured image of the graphical binding code allows for binding; and binding, via the server and in response to determining that the received information associated with the captured image of the graphical binding code allows for binding, the VDI media client of the end user device together with the VDI host client of the server. Aspects of the above non-transitory computer readable medium include wherein the graphical binding code instruction is at least partially configured to present the graphical binding code to an application window of a graphical user interface associated with the end user device. Aspects of the above non-transitory computer readable medium include wherein the enrollment information associated with the VDI media client of the end user device includes a binding code associated with an end user identification and password. Aspects of the above non-transitory computer readable medium include wherein VDI communications are separated into a media traffic channel and a signaling traffic channel, and wherein the VDI media client is configured to accommodate the media traffic channel and the VDI host client is configured to accommodate the signaling traffic. Aspects of the above non-transitory computer readable medium include wherein the graphical binding code is at least one of a quick response (QR) code, a barcode, a matrix barcode, and a machine-readable representation of data used to bind the VDI media client with the VDI host client. Aspects of the above non-transitory computer readable medium include wherein prior to receiving the captured image of the graphical binding code, the method further comprises: initiating an image capture function of the end user device; and capturing an image of the presented graphical binding code. Aspects of the above non-transitory computer readable medium include wherein prior to capturing the image of the presented graphical binding code, the method further comprises: determining an arrangement of one or more windows presented to the graphical user interface of the end user device; providing an instruction to arrange the one or more windows when it is determined that the presented graphical binding code of the application window is not completely visible; and arranging, in response to the instruction, the one or more windows such that the graphical binding code is completely visible on the graphical user interface. Aspects of the above non-transitory computer readable medium include wherein capturing the image of the presented graphical binding code further comprises: receiving an instruction at the end user device to perform an image capture of at least a portion of the graphical user interface, wherein the image capture is performed by an operating system of the end user device; and storing the captured image in a memory associated with the end user device. Aspects of the above non-transitory computer readable medium include determining whether the received information associated with captured image of the graphical binding code allows for binding further comprises: reading, by the server, the information associated with the captured image of the graphical binding code; determining, by the server, whether a match exists between the read information associated with the captured image of the graphical binding code and data stored in a server memory; and allowing, by the server and where a match exists, for binding between the VDI media client and the VDI host client. Aspects of the above non-transitory computer readable medium include wherein the method further comprises: receiving, at the server, an input to affirm the binding between the VDI media client and the VDI host client bound together; providing a subsequent graphical binding code instruction to the end user device, wherein the subsequent graphical binding code instruction is at least partially configured to present a subsequent graphical binding code to the application window of the graphical user interface associated with the end user device; receiving, at the server, information associated with a captured image of the subsequent graphical binding code; and determining, at the server, whether the binding of the VDI media client of the end user device and the VDI host client is affirmed based on the received information associated with the captured image of the subsequent graphical binding code.

Embodiments include a contact center, comprising: an end user device having a virtual desktop infrastructure (VDI) media client contained in a memory and executed by a processor of the end user device, the VDI media client configured to accommodate media traffic on a media traffic channel, wherein the end user device is configured to capture an image of a presented graphical binding code, and send information associated with the captured image of the graphical binding code across a communication network to at least one server; a collaboration server in communication with a VDI server having a VDI host client contained in a VDI server memory and executed by at least one server processor, the VDI host client configured to accommodate signaling traffic on a signaling channel, wherein the collaboration server is configured to receive enrollment information associated with the end user device, determine that the VDI media client of the end user device is not bound together with the VDI host client, provide a graphical binding code instruction to the VDI media client of the end user device, receive information associated with the captured image of a graphical binding code, determine whether the received captured image of the graphical binding code allows for binding, and in response to determining that the received information associated with the captured image of the graphical binding code allows for binding, bind the VDI media client of the end user device together with the VDI host client on the VDI server; and wherein VDI communications made by the end user device are separated into media traffic that is handled by the VDI media client on the end user device and signaling traffic that is handled by the VDI host client on the VDI server. Aspects of the above contact center include wherein the graphical binding code instruction is at least partially configured to present the graphical binding code to an application window of a graphical user interface associated with the end user device. Aspects of the above contact center include wherein determining whether the received information associated with the captured image of the graphical binding code allows for binding further comprises: reading the information associated with the captured image of the graphical binding code; determining whether a match exists between the read information associated with the captured image of the graphical binding code and data stored in a collaboration server memory; and allowing, where a match exists, for binding between the VDI media client and the VDI host client.

Although the term "QR code" is used herein, it should be appreciated that embodiments of the present disclosure can utilize any unique or substantially unique form of image-based identification. For instance, pictures, graphical codes, bitmaps, barcodes, matrix barcodes, QR codes, Micro QR codes, combinations thereof, and the like can be used in substitution of the QR code described herein. Accordingly, the term "QR code" as used herein should be understood to mean any graphical machine-readable representation of data.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
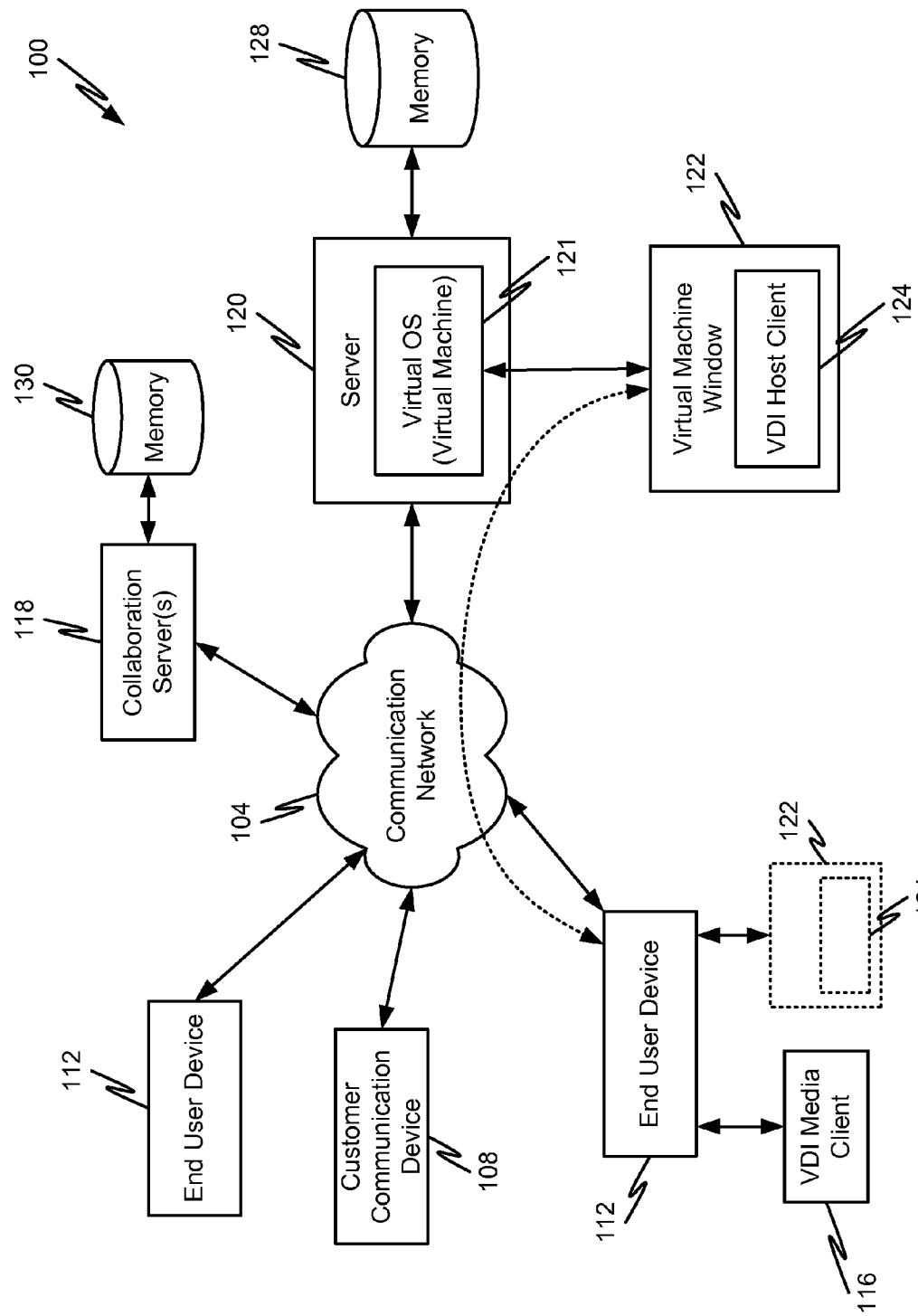
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more end user devices 112 to at least one server 118, 120, which may be owned and operated by an enterprise administering a contact center. The Virtual Desktop Infrastructure (VDI) server 120 may be configured with a Virtual Operating System (OS) 121 (i.e., Virtual Machine) and may include associated memory 128. The Virtual OS 121 may provide a Virtual Machine Window 122 to run a VDI Host client 124. The Virtual Machine Window 122 may be rendered by a VDI Host client process running on the Virtual OS 121. In some embodiments, the Virtual Machine Window 122 may be presented to one or more end user devices 112. For example, the Virtual Machine Window 122 may be present on an end user device 112 as a peer process to the VDI Media client 116. As can be appreciated, the Virtual Machine Window 122 may run in the end user device 112.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof. The communication network 104 may provide a variety of services, such as telephony services, video services, email services, instant messaging (IM) services, and the like between end user devices 112 and the server 120

The communication devices 108 may correspond to customer communication devices. In accordance with at least some embodiments of the present disclosure, a customer may utilize their communication device 108 to initiate a work item, which is generally a request for a processing resource associated with at least one resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources of a resource 112. The type of medium used by the communication device 108 to communicate with other communication devices 108 or processing resources may depend upon the communication applications available on the communication device 108.

The end user devices 112 can be any type of communication device having a processor and at least one operating system that can communicate on a network 104. In some cases, the end user devices 112 may also include a memory. Examples of end user devices 112 may include, but are in no way limited to, a personal computer (PC), smart phone, personal digital assistant (PDA), tablet, computer, laptop computer, desktop computer, cellular phone, handheld computer, and the like. The at least one operating system of the end user device 112 should be capable of performing a graphical user interface image-capture function. Examples of image-capture functions may include, but are in no way limited to, print screen, screen clipping, screen shots, and the like. The image-capture may be used to capture the whole of a graphical user interface and/or portions (e.g., windows, screen shots, areas, etc., and/or combinations thereof) of a graphical user interface. Once the function is performed, the captured image may be stored in a memory (e.g., a clipboard, local storage, remote storage, or other computer readable medium) associated with the end user device 112. In some embodiments, the end user device 112 may be configured as a thin client. In other words, a majority of the intensive VDI processing, including at least some operating system and application functionality may be performed by at least one server 118, 120 of the system 100. It should be appreciated that any number of end user devices 112 may be attached to the communication network 104.

In some embodiments, the end user devices 112 may be configured to run a VDI Media client 116. In general, the VDI Media client 116 may be configured as software that is run natively on the end user device 112 and/or run via a virtual desktop across the communication network 104 accessed by the end user device 112. The VDI Media client 116 may include instructions configured to handle media traffic between the end user device and one or more entities (e.g., Collaboration Server 118, customer communication device 108, end user device 112, etc.) across the network 104. In some embodiments, the media traffic may be separated from signaling traffic. The VDI Media client 116 may be configured to receive information from a VDI Host client 124 via a Collaboration Server 118.

In one embodiment, the Collaboration Server 118 may receive binding requests from the VDI Host client 124. Additionally or alternatively, the Collaboration Server 118 may be responsible for Session Initiation Protocol (SIP) registration and/or proxy routing. Upon receiving a binding request, the Collaboration Server 118 may begin a progressive broadcast search to find a VDI Media client 116 associated with an end user device 112. This end user device 112 may perform a screen-capture, detect a QR code if it exists, and return information from the QR code that can be compared by the Collaboration Server 118 to the binding request to prove that it has captured the exact QR code that is being displayed by the VDI Host client 124 that initiated the binding request. It should be appreciated that the Collaboration Server 118 may be a cluster of servers.

In accordance with at least some embodiments of the present disclosure, the VDI Server 120 may be configured to host VDI end user desktop environments that can be accessed over the communication network 104 by one or more end user devices 112. In one embodiment, the VDI Server 120 can be any device or combination of devices that provide virtual services. For example, the VDI Server 120 may provide a variety of virtual services, such as virtual desktop integration, virtual applications, virtual machine windows 122, virtual disk drives, and the like. Additionally or alternatively, the VDI Server 120 may provide virtualization of various types of operating systems (e.g., Virtual OS 121, etc.), applications, and the like. Examples of operating systems may include, but are not limited to, Linus Torvalds' Linux® OS, Microsoft's Windows® OS, Apple's Mac OS®, and the like. As can be appreciated, the VDI Server 120 may be a cluster of servers. In some embodiments, the VDI Server 120 may provide one or more virtualized applications. For instance, the VDI Server 120 may provide a virtualized email application, video conferencing software, a soft telephone, and the like that can be virtualized on the end user device 112.

In some embodiments, the VDI Host client 124 may be run as software via the VDI Server 120. The VDI Host client 124 may be configured to handle signaling traffic for one or more end user devices 112 and/or clients. The VDI Media client 116 may launch and run locally on the end user device 112. In one embodiment, the user of an end user device 112 may login to, or register with, the Collaboration Server 118. This login may be achieved by the Virtual OS 121 communicating with the Collaboration Server 118 across the communication network 104. Additionally or alternatively, the login may be performed automatically and/or in response to a user input. One example of an automatic registration may include when an end user device 112 is detected on the communication network 104 via the Collaboration Server 118. Examples of registration performed in response to a provided user input may include a user logging into a VDI environment via the end user device 112 and/or via at least one soft client 116, 124. In some cases, the login operation may require specific information, such as, an identification, a password, and the like. This information may be provided via an end user device 112, the Collaboration Server 118, and/or at least one soft client 116, 124. As one example, the VDI Host client 124 may learn from the OS what a user's credentials area, and/or prompt for the credentials, and register with the Collaboration Server 118.

The VDI Host client 124 and/or the VDI Server 120 may communicate with one or more end user devices 112 to perform the methods disclosed herein. In some cases, the communication may be made via at least one Collaboration Server 118. Among other things, the Collaboration Server 118 may provide commands to end user devices 112 to perform a binding operation. In some cases, the QR codes may be presented to the end user devices 112 via the VDI Host client 124. Additionally or alternatively, the VDI Media client may receive codes captured by the end user device 112. As can be appreciated, the QR codes may be provided to the Collaboration Server 118 which can be configured to review the code and even perform the binding operations provided herein.

In some embodiments, the VDI Server 120 may communicate with a memory 128. As can be appreciated, the memory 128 may be used to store rules, binding information, end user device 112 verification information, registration information, and other data. In one embodiment, this data may be used by the VDI Server 120 to track statistics relating to registration, binding, end user access, work time, break time, idle time, and more. The memory 128 may be used in connection with the execution of application programming or instructions by the VDI Server 120, and for the temporary or long term storage of program instructions and/or data. As examples, the memory 128 may comprise ROM, RAM, DRAM, SDRAM, or other solid state memory. Additionally or alternatively, the memory 128 may comprise a hard disk drive or other random access memory. In any event, the memory 128 may include at least one operating system.

In some embodiments, the Collaboration Server 118 may communicate with a memory 130. As can be appreciated, the memory 130 may be used to store rules, binding information, end user device 112 verification information, registration information, and other data. In one embodiment, this data may be used by the Collaboration Server 130 to track statistics relating to registration, binding, end user access, work time, break time, idle time, and more. The memory 130 may be used in connection with the execution of application programming or instructions by the Collaboration Server 118, and for the temporary or long term storage of program instructions and/or data. As examples, the memory 130 may comprise ROM, RAM, DRAM, SDRAM, or other solid state memory. Additionally or alternatively, the memory 130 may comprise a hard disk drive or other random access memory. In any event, the memory 130 may include at least one operating system.

Figure 2A:
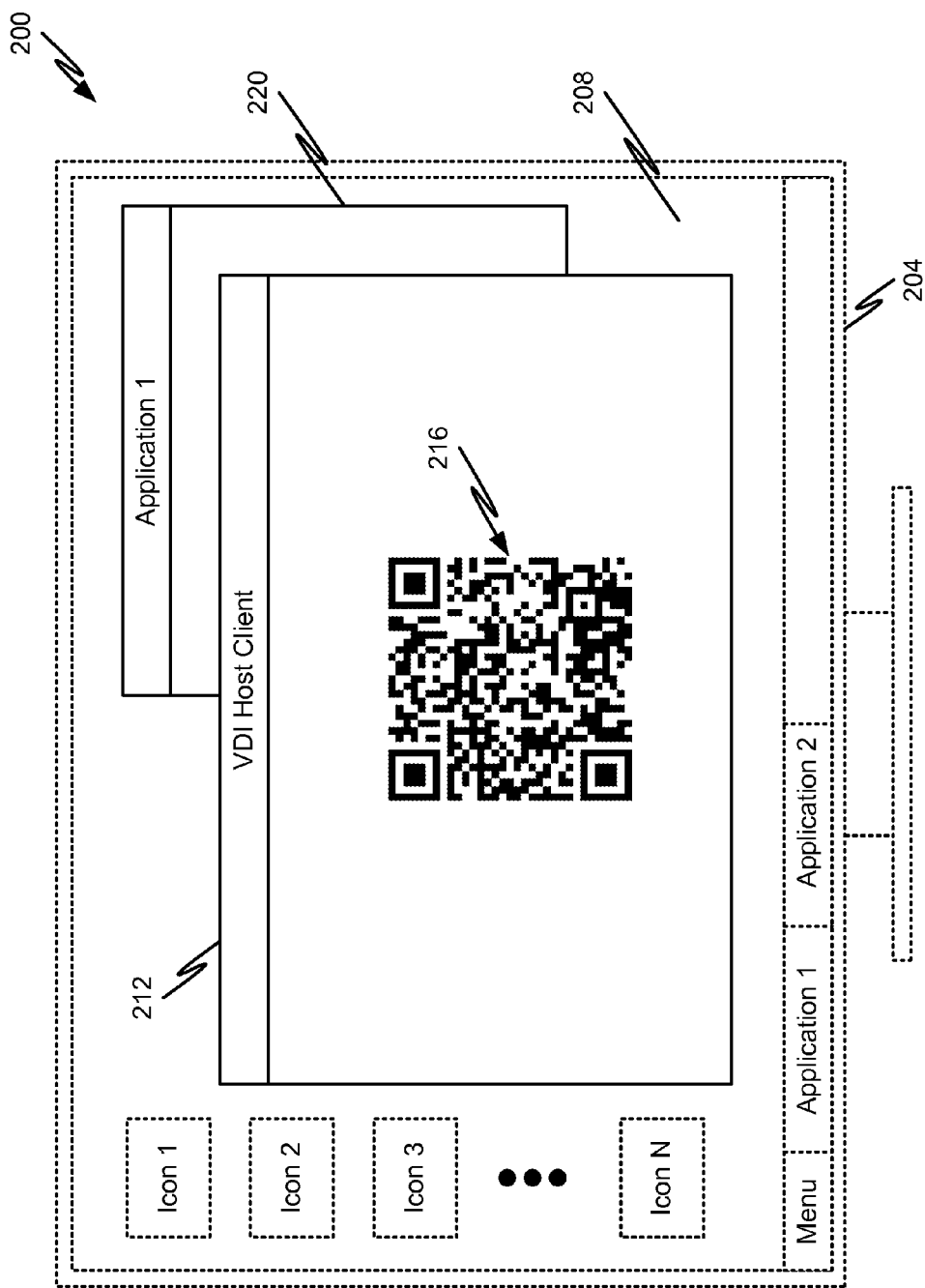
FIG. 2A is a block diagram depicting a first configuration of a graphical user interface of a device in accordance with embodiments of the present disclosure.
Figure 2B:
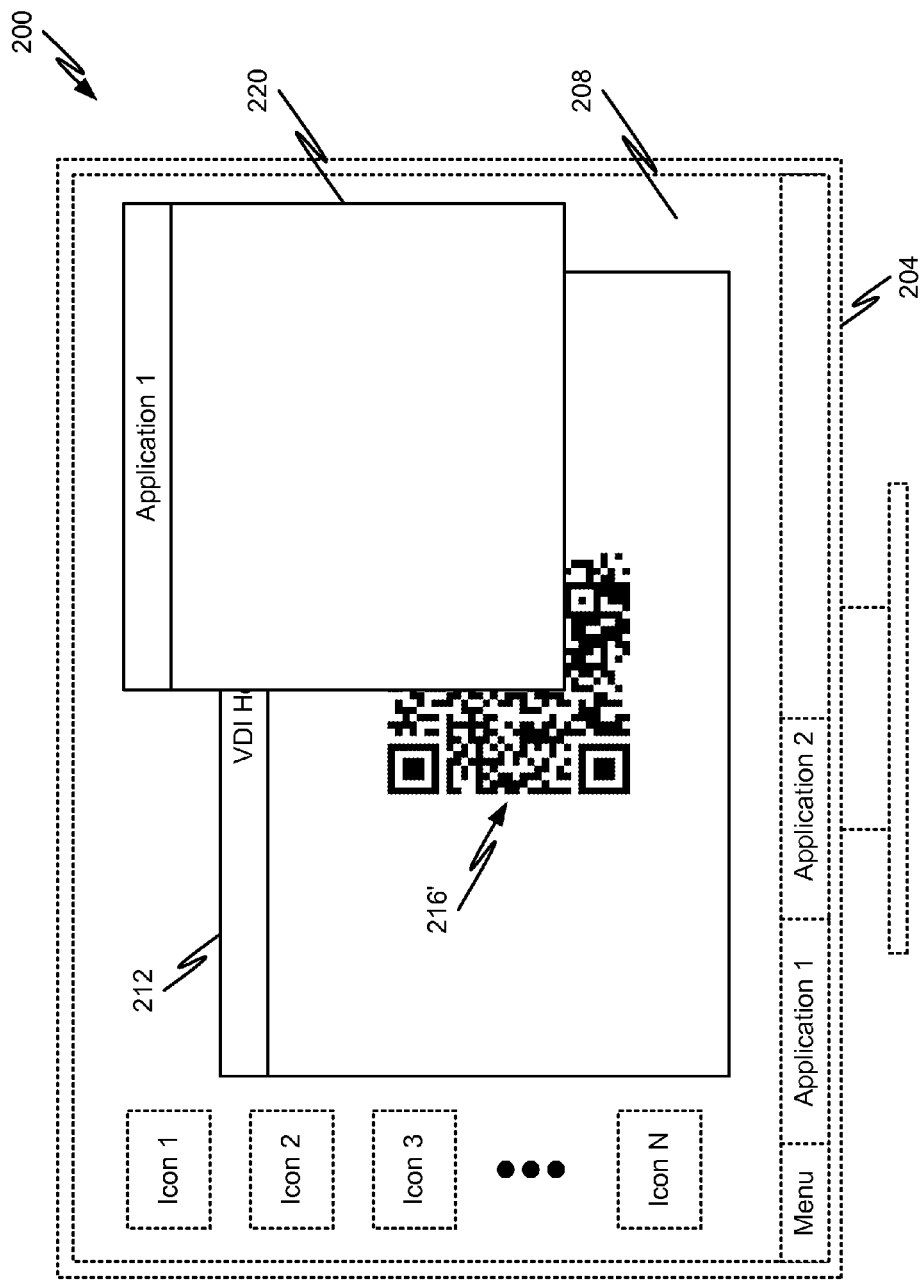
FIG. 2B is a block diagram depicting a second configuration of a graphical user interface of a device in accordance with embodiments of the present disclosure.

FIGS. 2A and 2B depict a block diagram of various configurations of a graphical user interface (GUI) 204 of a device 112 in accordance with embodiments of the present disclosure. In general, the GUI 204 can be any hardware and/or software that provides a graphical user interface to a user of the end user device 112. The GUI 204 can be a separate device, such as a monitor, or can be integrated into a virtual desktop. Examples of GUIs 204 may include, but are not limited to, a liquid crystal display (LCD), a plasma display, a cathode ray tube (CRT) display, a light emitting diode (LED) display, electronic paper display, carbon nanotube display, combinations thereof, and the like. In some embodiments, the GUI 204 may include additional software, such as software drivers for displaying information in the GUI 204.

In some embodiments, the GUI 204 may include a desktop 208 with one or more open application windows 212, 220. For example, the GUI 204 may be configured to display the contents of one or more applications via a displayable window 212, 220. It should be appreciated that the GUI 204 and/or its contents may be maintained in a memory. As such, application content, windows, operating system components, and the like, that are presented to the GUI 204 may still provide information even if a display associated with the GUI 204 is not active (e.g., if a monitor or display is turned off or not powered on). In one embodiment, all of the windows 212, 220 may be hosted by the native OS on the end user device 112.

Referring to FIG. 2A, a first open application window 212 is shown displaying content associated with a VDI Host client 124. In some embodiments, the VDI Host client 124 may correspond to an application that is run remotely in Virtual OS 121. For instance, the VDI Host client 124 may be configured as instructions stored in a memory associated with the end user account in Virtual OS 121 and executed by a processor of the server 120. In any event the VDI Host client 124 may be represented by an open application window 212 of the GUI 204. In other embodiments, the open application window 212 may correspond either to an application that is running natively on device 112, or to an application that is configured to send information to at least one server 118, 120. Additionally or alternatively, the application may receive information from at least one server 118, 120. In any event, whether sending or receiving information, the information may be exchanged with the at least one server 118, 120 through a VDI Host client 124, and through the native device 112.

In some embodiments, the VDI Host client 124 may provide a code to the end user device 112. This code may be in the form of a graphical code such as a barcode, matrix barcode, QR code, Micro QR code, other graphical machine-readable representations of data, combinations thereof, and the like. As provided in FIG. 2A, the code is shown in the form of a QR code 216. In one embodiment, the QR code 216 may be created by the VDI Host client 124 and presented to the open application window 212 via the VDI Server 120. The QR code 216 may contain information relating to one or more of the Collaboration Server 118, VDI Server 120, the VDI Host client 124, the VDI Media client 116, an end user, an end user device 112, binding instructions, binding, VDI Media client registration, end user device application, network addresses, Media Access Control (MAC) addresses, identification, and the like. It is anticipated that the presentation of the QR code 216 to the open application window 212 includes graphically displaying the QR code 216. The graphical display of the QR code 216 may be at least one of virtual (e.g., to a memory associated with the end user device 112) and physical (e.g., to a monitor and/or display associated with the end user device 112). In some embodiments, the QR code 216 may be displayed in a portion of the open application window 212. For instance, the QR code 216 may be graphically displayed in an inconspicuous portion of the open application window 212 such that it is machine-detectable, or readable, but not at least readily detectible by an end user of the end user device 112. In one embodiment, the QR code 216 may be displayed in a portion of a margin, logo, border, picture, image, toolbar, tool, marking, or other area associated with the open application window 212.

In other embodiments, a VDI Host client 124 may generate and display a QR code 216 that contains at least some of the information provided above, then via Collaboration Server 118 instruct the VDI Media client 116 to capture its screen (e.g., via the end user device 112, etc.) and return any detected QR code 216 for inspection as a possible binding match. Although described as a QR code 216, it should be appreciated that the code may be in the form of a graphical code such as a barcode, matrix barcode, QR code, Micro QR code, other graphical machine-readable representations of data, combinations thereof, and the like. In the event that the Collaboration Server 118 instructs the VDI Media client 116 to capture a QR code 216 using the end user device's 112 operating system screen capture capability, the resulting captured information may be passed from the VDI Media client 116 (or other end user device 112 native application), to the VDI Host client 124 (e.g., via the Collaboration Server 118 and/or the VDI Server 120) where it can be compared against the original QR Code. As can be appreciated, a match of QR code indicates that the instance of VDI Media client 116 and the instance of VDI Host client 124 are operating in the same end user device 112 and therefore may be considered bound by each of the components along the binding path. It should also be appreciated that any component along the binding path may instigate a binding operation and may be the arbiter of success as long as the appropriate levels of component interaction are defined. In a preferred implementation, the binding broadcast and binding arbitration are efficiently performed by Collaboration Server 118 in response to an initial Registration Request from VDI Host client 124 and successive screen capture results from candidate end user devices 112.

FIG. 2B shows a first open application window 212 at least partially obscured by a second open application window 220 presented to a GUI 204 in accordance with embodiments of the present disclosure. In particular, the second open application window 220 is obscuring the presented image of the QR code 216'. In one embodiment, the second open application window may correspond to either a native desktop application or a separate child window of the VDI Host client 124 application of the Virtual OS 121 in the VDI Server 120. As can be appreciated, any number of items arranged on a GUI 204 may be caused to overlap and/or obscure the QR code 216' presented to the first open application window 212. For instance, the first open application window 212 having the QR code 216' may have been moved off of the displayable portion of the GUI 204. In this case, the QR code 216' would be invisible to an image/screen capture. Although shown in FIG. 2B as an open application window 212, it should be appreciated that the QR code 216' may be obscured by one or more of a window, a pointer, a pop-up, text, hint box, cursor, and or other graphical shape presented via the GUI 204. As described in greater detail below, embodiments of the present disclosure provide for detecting that the QR code 216' may be inactive, obscured, blocked, hidden, and/or invisible, whether partially or fully. In response, the operating system of the end user device 112 may arrange the QR code 216', and/or the window having the QR code 216', in an active, visible, unobscured, and/or unblocked presentation. This arrangement may be provided prior to taking an image-capture of the QR code 216'. In one embodiment, the VDI Media client 116 may determine a priority to one or more windows displaying a local virtual machine window in the native OS collection of windows.

Figure 3:
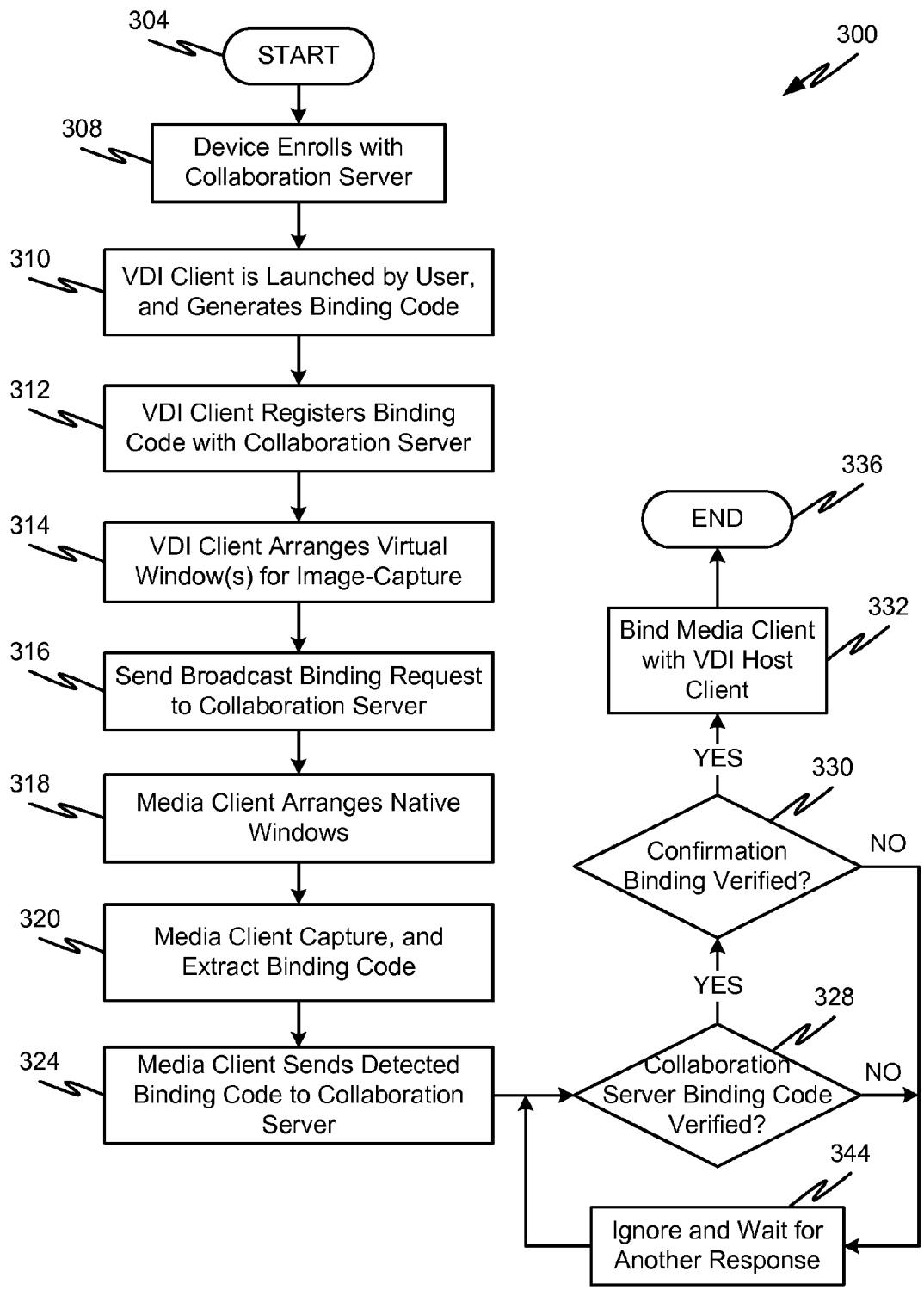
FIG. 3 is a flow diagram depicting a first method of binding a virtual desktop infrastructure host and media soft client together in accordance with embodiments of the present disclosure.

Referring now to FIG. 3, a flow diagram is provided in accordance with embodiments of the present disclosure depicting a first method 300 of binding a VDI Host 124 and VDI Media client 116 together, where the VDI Media client 116 will first enroll to make the device known to the network, and later will be commanded to capture and return a QR code allowing the device to be associated with a logged-in user of the exact VDI Host client 124 which displayed the QR code. The method 300 begins at step 304 and proceeds when an end user device 112 is enrolled with the Collaboration Server 118 (step 308). In some cases, enrollment may be accomplished via a manual process. For example, a VDI Media client 116 may be initiated on an end user device 112 when the device boots. When the VDI Media client 116 is initiated, the Media client 116 may prompt a user to enroll the device to the Collaboration Server 118. Once enrolled, the VDI Media client 116 may communicate with the Collaboration Server 118, although at this point the user assigned to the device is, as yet, unspecified. The enrollment may include information that the VDI Media client 116 is not currently bound with the VDI Host client 124. As such, any communications provided by the VDI Media client 116 would not benefit from the VDI signaling provided by the VDI Host client 124.

In some embodiments, the end user device 112 may enroll automatically with the Collaboration Server 118. The automatic enrollment may be accomplished by running a VDI Media client 116 on the end user device 112 using cached enrollment credentials. Once the VDI Media client 116 is initiated, the Media client 116 may communicate and/or enroll with the Collaboration Server 118. Similar to communication outlined above, this enrollment with the server 118 may include information that the VDI Media client 116 is not currently bound with a VDI Host client 124. Whether the enrollment is performed via a manual, automatic, or semi-automatic process, the Collaboration Server 118 has enough information to send a binding initiation command code, or broadcast binding message, to one or more VDI media clients 116 and/or end user devices 112 which will be initiated later in step 316. The VDI media clients remain in this "enrolled but not registered" state until they can be bound as described below.

Next, the method 300 continues when a VDI Host client 124 is launched for a known user which causes the generation of a binding code (step 310) which is sent to the Collaboration Server 118 via the VDI Server 120 as a parameter of the VDI Host client 124 registration in step 312. In one embodiment this same binding code is also encoded into and displayed as a QR code 216 in the application window 122 of the VDI Host client 124, which may be displayed in the remote desktop window of the end user device 112. In some embodiments, the binding code may be provided as a QR code 216 as disclosed herein. For example, the VDI Server 120 may cause the QR code 216 to be presented to the first open application window 212 associated with the VDI Host client 124.

The method 300 continues at step 314 by beginning to prepare the GUI 204 of the end user device 112 which may include an acceptable arrangement of open application windows 212, 220. A window arrangement is acceptable in accordance with embodiments of the present disclosure if the QR code 216 is presented to the GUI 204 in an unobscured/unblocked fashion. In other words, the window arrangement is acceptable if the content of the presented QR code 216 can be read by a machine (e.g., computer, server, and/or other processor running a code reading application, etc.). As previously stated, the GUI 204 and/or its contents, including a presented QR code 216, may be maintained in a memory, and as such, application content, windows, operating system components, and the like, that are presented to the GUI 204 may still provide information even if a display associated with the GUI 204 is not active (e.g., if a monitor or display is turned off or not powered on). The determination of the arrangement of one or more windows associated with a GUI 204 of an end user device 112 can be performed via the VDI Media client 116, an application running via the end user device 112, the VDI Server 120, and/or the VDI Host client 124. In some embodiments, it requires a cooperative effort as next described.

To ensure that the window arrangement of GUI 204 is acceptable to perform an image-capture of the QR code 216, the method 300 continues with the VDI Host client 124 arranging the virtual windows of the VDI Host applications for image-capture with the display of the QR code in front (step 314). When this is complete, the VDI Host client 124 will request the collaboration server 118 to begin a broadcast binding request to be sent to each enrolled and unbound device in step 316 to elicit potential binding responses. A broadcast binding request may prioritize the list of unbound device recipients and meter the transmission of binding requests according to proximity, previous successful bindings, or any other suitable attribute to maximize the speed at which binding is likely to occur and minimize network traffic.

The method 300 continues in step 318 where any VDI Media client 116 receives a broadcast binding request. In some embodiments, upon receiving a binding request, the VDI Media client 116 requests the native OS of end user device 112 to put the most recent VDI Host client window on top (step 318). For example, a QR code 216 presented to the open application window 212 associated with the VDI Media client 116 may be shown by the native OS of the end user device 112 providing a "maximize" window instruction. Additionally or alternatively, the native OS of the end user device 112 may instruct the open application window 212 to be presented to a particular area and/or region of the GUI 204. In another embodiment, the one or more windows not associated with the QR code 216 may be instructed to "minimize," or otherwise unblock the open application window 212 having the QR code 216. In yet another embodiment, the native OS of the end user device 112 may be configured to determine a priority associated with one or more windows displayed to the GUI 204 and even shift the priority as required to read the QR code 216. As can be appreciated, combinations of instructions may be used to manipulate the windows presented to the GUI 204 to show the QR code 216. In some embodiments, the instructions disclosed herein may be provided by the VDI server 120, the VDI Host client 124, the VDI Media client 116, and/or the operating system of the end user device 112. Upon having arranged the one or more virtual windows (step 314) and one or more native windows (step 318) for an image-capture of the QR code 216, the method 300 may continue at step 320.

Once the one or more windows 212, 220 of the GUI 204 are determined to be arranged in an acceptable configuration for QR code 216 image-capture, the method 300 continues by initiating the image-capture followed by the possible detection and decoding of QR code 216 binding code (step 320). The image-capture may be performed via the native OS of the end user device 112 initiating an image-capture function associated with the end user device 112. For example, the operating system of the end user device 112 may include image-capture functionality. Among other things, this functionality can be used to record an image of the provided QR code 216. In some embodiments, the captured image having the QR code 216 may be stored in a memory that can be accessed via the VDI Media client 116. The captured image is then analyzed to detect any included QR codes and extract from them possible binding code information.

The method 300 continues by a candidate VDI Media client 116 sending the detected binding code from the captured QR code 216 to the Collaboration Server 118 (step 324) as a response to the binding request received at step 318. In one embodiment, if no binding code is detected, no response will be sent to the Collaboration Server 118 in order to minimize load on the network and the server. Detection of the binding code may be provided by an application running on the end user device 112. For instance, the end user device 112 may be configured to communicate with the Collaboration Server 118 and send the binding code for binding and/or verification. This captured binding code may be sent to the Collaboration Server 118 via the native OS of the end user device 112. In one embodiment, only the binding code embedded in the image may be sent. In this instance, the binding code may be extracted from the raw image. Additionally or alternatively, the software on the native client may be responsible for finding the QR code image and extracting the embedded QR code.

When the Collaboration Server 118 receives the binding code, the method 300 continues by the Collaboration Server 118 determining whether the detected binding code includes an acceptable code for binding purposes (step 328). This determination may include verifying that the binding code exactly matches the binding code that a VDI Host client 124 generated in step 310, verifying that the VDI Media client 116 from which the binding code was received is currently in an unbound state, and verifying that the binding code was recently generated and is still valid. If the binding code is acceptable, method 300 continues by performing an additional confirmation binding verification in step 330, otherwise the response is ignored in step 344 and the Collaboration Server waits for a more suitable response again in step 328.

The method 300 continues in step 330 with the Collaboration Server 118 performing a confirmation binding, verifying that a newly chosen confirmation binding code is also validated without using broadcast to initiate a new binding request to any VDI Media client 124 other than the one currently under consideration for binding. The confirmation binding verification is necessary to protect against replay and fishing attacks attempting to bind rogue clients. The Collaboration Server 118 generates a short-lived binding code of its own and instructs the VDI Host client 124 to replace the QR-code image that it is currently displaying with one that includes the new binding code. The Collaboration Server 118 then commands only the VDI Media client 116 from which it had received the binding response to capture and return a binding code currently being displayed. No adjustments to windows arrangements are made during the confirmation binding operation, and the VDI Media client 116 must provide a response. If it is determined that the response to the confirmation binding cannot be verified, the method 300 may continue at step 344 where the current response is ignored, and the Collaboration Server 118 continues to wait for the next response.

However, if the confirmation binding response is acceptable, the method 300 may continue by binding the VDI Media client 116 associated with the end user device 112 with the VDI Host client 124 within the Collaboration Server 118 (step 332), by terminating further broadcast binding requests for this VDI Host client 124, and by registering this VDI Media client 116 as a known device for the user of the VDI Host client 124. In some embodiments, an acceptable binding code is a code that can be verified by the Collaboration Server 118 in accordance with rules stored in memory 130. In other words, the Collaboration Server 118 may compare the binding code to verification information stored in memory 130 including, but not limited to the original candidate QR binding code itself. The memory 130 may include rules to determine whether the information associated with the binding code will allow verification. If the code is acceptable, the Collaboration Server 118 may notify the VDI Server 120 which will instruct the VDI Host client 124 to initiate a direct shared-control session with the VDI Media client 116 through the Collaboration Server 118. This binding performed by the Collaboration Server 118 allows the VDI Media client 116 to handle media traffic while the VDI Host client 124 handles signaling traffic associated with the VDI. The method 300 ends at step 336.

It should be apparent to one skilled in the art that the responsibility for the extraction of the binding code from the image-captured QR code 216 may be delegated from the VDI Media client 116 to the Collaboration Server 118 without departing from the spirit and scope of the claimed invention. This may be accomplished by sending the captured image in place of the extracted binding code, and performing the work of image analysis and binding code extraction on the Collaboration Server 118.

Figure 4:
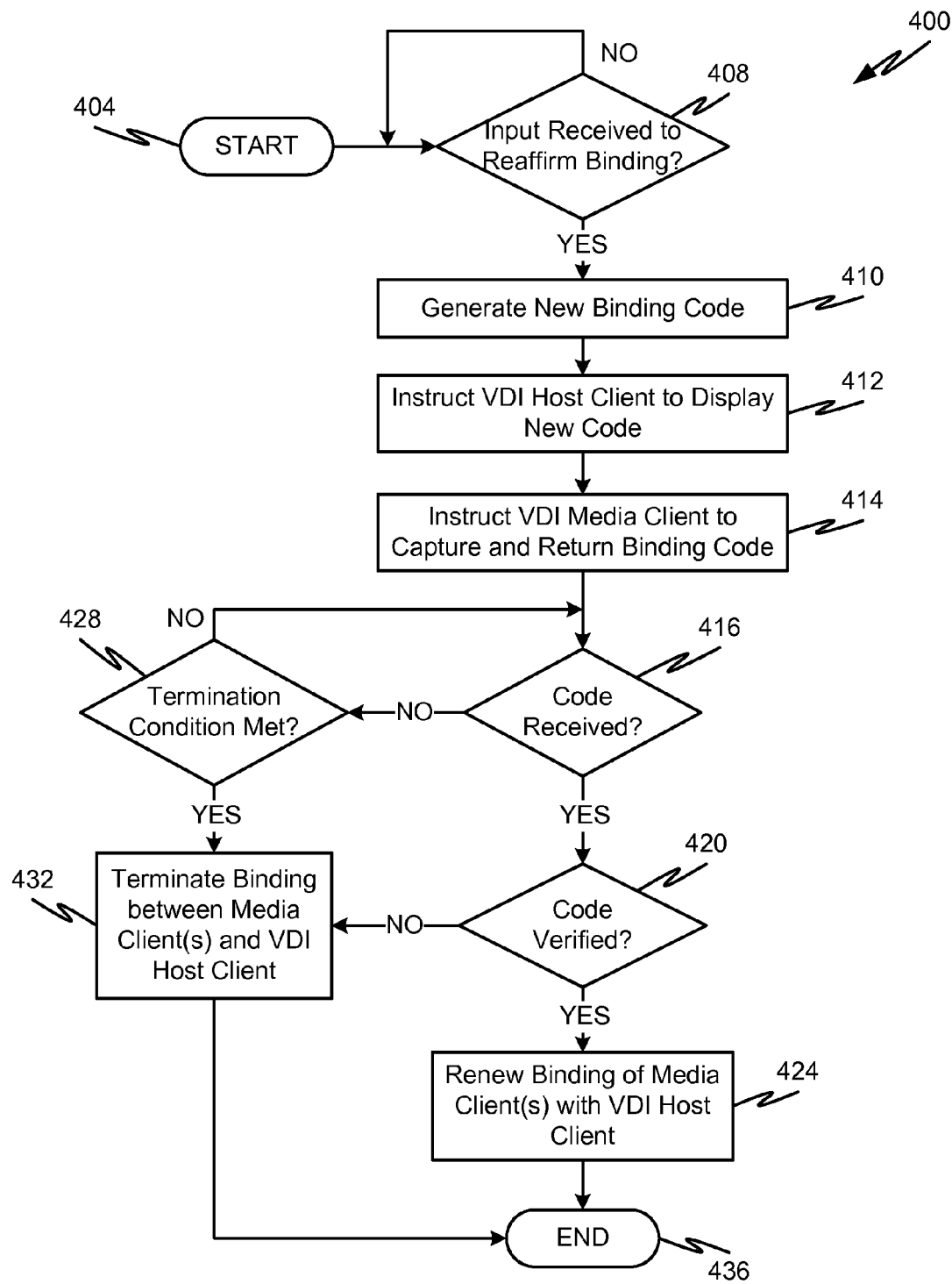
FIG. 4 is a flow diagram depicting a second method of binding a virtual desktop infrastructure host and media soft client together in accordance with embodiments of the present disclosure.

FIG. 4 is a flow diagram depicting a second method 400 of binding a VDI Host client 124 and VDI Media client 116 together in accordance with embodiments of the present disclosure. In some embodiments, the method 400 may be performed substantially at the Collaboration Server 118. As provided herein, a Collaboration Server 118 may bind a VDI Media client 116 with a VDI Host client 124 for a specific period of time. In one embodiment a VDI Media client 116 may be bound with a VDI Host client 124 indefinitely. In any event, embodiments of the method 400 disclosed herein can reaffirm binding between the VDI Media client 116 and the VDI Host client 124. Among other things, the Collaboration Server 118 may determine that binding should be reaffirmed for security purposes. For example, it is common in VDI environments for employees to time-share equipment under different logins. If a network outage occurred during logoff it might be possible for a stale binding to linger in the network. The stale binding would be detected and removed during the process of reaffirming bindings. In another example, a company may wish to reaffirm binding between VDI Media clients 116 and the VDI Host client 124 periodically to monitor work activity. For instance a user may be idle at an end user device 112 for a specific period of time. Upon the expiration of an idle timer, the user's end user device 112 may be prompted to reaffirm the binding as provided herein. As can be appreciated, information associated with binding including, but not limited to, the number of bindings, expired timers, revocation of bindings, unreaffirmed bindings, and the like, may be tracked and even stored in memory 128, 130. Among other things, this information may be used to evaluate one or more users, connections, services, and more.

In some embodiments, the method 400 begins at step 404 and proceeds when an input is received that requires one or more end user devices 112 and/or VDI Media clients to reaffirm binding (step 408). If no input is received, the method 400 may end or continue to wait for an input for reaffirming binding. Examples of inputs may include, but are in no way limited to, the expiration of a timer, a loss of communication, an administrative input, a security protocol, random reaffirmation inputs, an input initiated based on stored rules, and/or other conditions associated with a user, end user device 112, and the like. For instance, a security protocol may require end user devices 112 to reaffirm the binding between the VDI Media client 116 and the VDI Host client 124 on occasion to ensure that the end user devices 112 are allowed to access the capabilities provided by the VDI Server 120 and the VDI Host client 124. The occasional reaffirmation may be caused to initiate based on a timer input. In some cases, the input may be provided to the Collaboration Server 118 when the timer expires. As can be appreciated, the timer may be set to repeat at specific programmed intervals. The programmed intervals are not necessarily linear and may adjust based on a number of factors. This non-linear approach may give the impression that the programmed intervals are pseudo-random in nature.

When the input is received by the Collaboration Server 118, the method 400 continues by generating a new binding code (step 410). Reaffirming a binding code may be substantially similar, if not identical, to performing a confirmation as described in conjunction with step 330 of FIG. 3. Similar to generating the binding code as described, the VDI Host client 124 may generate a new binding code that contains information used in binding a VDI Media client 116 and the VDI Host client 124 together. In generating the new binding code, the information may include a code different from a previously generated binding code. Next, the method 400 continues by instructing the VDI Host client 124 to display the new binding code (step 412). In some embodiments, the new binding code may be displayed to a first end user device 112 as provided herein. Additionally or alternatively, the new binding code may replace any existing QR-code 216 displayed via VDI Host client 124 to present the new QR-code having the new binding code. The VDI Media client 116 may be instructed to capture and return the binding code (step 414). In some embodiments, the instruction to capture and return a binding code may be provided by the Collaboration Server 118. The binding code is then returned to the Collaboration server 118. As can be appreciated, the broadcast need not be used in this scenario. Additionally or alternatively, only bound and paired devices may be reaffirmed.

Next, the method 400 continues by determining whether the binding code received from the one end user device 112 that was previously bound returned a binding code response (step 416). In the event that no code is received at the Collaboration Server 118, the method 400 may proceed to step 428 and determine whether a termination condition has been met. Examples of a termination condition may include, but are not limited to, an expiration of a timer, a qualifying number of iterations through at least a portion of the method 400, a cycle count, an identification check, and the like. If the termination condition is met, the method proceeds to step 432, where the binding between the VDI Media client 116 and the VDI Host client is terminated for the one end user devices 112 associated with the termination condition. However, if the termination condition is not met, the method 400 returns to step 416 where it awaits a response.

The method 400 continues by the Collaboration Server 118 determining whether the captured image includes an acceptable binding code for binding purposes (step 420). This determination may include verifying that the new binding code matches the new binding code that the VDI Host client 124 generated in step 410. Among other things, the verification may be used to determine that the VDI Media client 116 from which the new binding code was received is currently in a bound state. Additionally or alternatively, the verification may include determining that the new binding code was recently generated and is still valid. If the new binding code is acceptable, method 400 may optionally continue by performing an additional confirmation binding verification, otherwise the method 400 continues by terminating the binding between the VDI Media client 116 and the VDI Host client 124 (step 432). The additional confirmation binding verification may include verifying that the newly chosen confirmation binding code is also validated without using broadcast to initiate a new binding request to any VDI Media client 124 other than the one currently under consideration for binding. If it is determined that the response to the confirmation binding cannot be verified, the method 400 may continue at step 432 where the binding between the VDI Media client 116 and the VDI Host client 124 are terminated.

In the event that the QR code 216 in the captured image is acceptable, the method 400 may continue by renewing the binding on the basis of the new binding code, between the VDI Media client 116 associated with the end user device 112 with the VDI Host client 124 (step 424). As previously disclosed, the binding performed by the Collaboration Server 118 allows the VDI Media client 116 to handle media traffic while the VDI Host client 124 handles signaling traffic associated with the VDI. The method 400 ends at step 436.

In one embodiment, the QR code 216 may be presented to a first end user device 112 that is separate from a second end user device. In this case, the screen-capture may be performed by a camera of the second end user device. For instance, a fixed desk phone (e.g. first end user device) may include a display capable of displaying a QR code 216 as provided above. Continuing this example, rather than using a screen capture function associated with the fixed desk phone, a camera associated with a smart phone (e.g., the second end user device) may capture the QR code 216 by taking an image of the code displayed to the fixed desk phone. As can be appreciated, the camera may be used to assert the binding based at least partially on proximity. In some embodiments, the desk phone in this example may not know when to display the QR code 216. In one embodiment a button, switch, or other interactive user interface element may be provided to initiate the display of the QR code 216 to facilitate a quick binding operation. It is an aspect of the present disclosure that the broadcast may be disabled when an interactive user interface element is provided to initiate the display of the QR code 216. As can be appreciated, an end user device's 112, or smart-phone's, service request may initiate the validation checks as described herein.

It is an aspect of the present disclosure that a common service may be employed between a communication network of the desk phone (e.g., wired network, etc.) and a communication network of the smart phone (e.g., wireless network, etc.) to validate the smart phone captured image with what the communication service knows to have displayed to the desk phone. In some embodiments, a common service, and any common service broadcasts, may be provided by the Collaboration Server 118. Among other things, this method may protect against replay attacks by, and/or act as a second verification step, by requiring that devices (e.g., the first end user device and the second end user device, etc.) are in visual proximity at a period of time when the image capture is performed by the smart phone. For instance, in the previous example, the period of time may be the same instant that the camera of the smart phone captures the image from the desk phone.

It should be appreciated that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    receiving, at a server, enrollment information associated with a virtual desktop infrastructure (VDI) media client of an end user device across a communication network;
    determining, by at least one processor of the server, that the VDI media client of the end user device is not bound together with a VDI host client;
    providing a graphical binding code instruction to the VDI media client of the end user device;
    receiving, at the server, information associated with a captured image of a graphical binding code;
    determining, by the at least one processor of the server, whether the received information associated with the captured image of the graphical binding code allows for binding; and
    binding, via the server and in response to determining that the received information associated with the captured image of the graphical binding code allows for binding, the VDI media client of the end user device together with the VDI host client.

2. The method of claim 1, wherein the enrollment information associated with the VDI media client of the end user device includes a binding code associated with an end user identification and password.

3. The method of claim 1, wherein VDI communications are separated into a media traffic channel and a signaling traffic channel, and wherein the VDI media client is configured to accommodate the media traffic channel and the VDI host client is configured to accommodate the signaling traffic.

4. The method of claim 1, wherein the graphical binding code is at least one of a quick response (QR) code, a barcode, a matrix barcode, and a machine-readable representation of data used to bind the VDI media client with the VDI host client, and wherein the graphical binding code instruction is at least partially configured to present the graphical binding code to an application window of a graphical user interface associated with the end user device.

5. The method of claim 4, wherein prior to receiving the captured image of the graphical binding code, the method further comprises:
    initiating an image capture function of the end user device; and
    capturing an image of the presented graphical binding code.

6. The method of claim 5, wherein prior to capturing the image of the presented graphical binding code, the method further comprises:
    determining an arrangement of one or more windows presented to the graphical user interface of the end user device;

providing an instruction to arrange the one or more windows when it is determined that the presented graphical binding code of the application window is not completely visible; and arranging, in response to the instruction, the one or more windows such that the graphical binding code is completely visible on the graphical user interface.

7. The method of claim 5, wherein capturing the image of the presented graphical binding code further comprises:

receiving an instruction at the end user device to perform an image capture of at least a portion of the graphical user interface, wherein the image capture is performed by an operating system of the end user device; and storing the captured image in a memory associated with the end user device.

8. The method of claim 1, wherein determining whether the received information associated with the captured image of the graphical binding code allows for binding further comprises:

reading, by the server, the information associated with the captured image of the graphical binding code;

determining, by the server, whether a match exists between the read information associated with the captured image of the graphical binding code and data stored in a server memory; and allowing, by the server and where a match exists, for binding between the VDI media client and the VDI host client.

9. The method of claim 1, further comprising:

receiving, at the server, an input to affirm the binding between the VDI media client and the VDI host client bound together;

providing a subsequent graphical binding code instruction to the end user device, wherein the subsequent graphical binding code instruction is at least partially configured to present a subsequent graphical binding code to the application window of the graphical user interface associated with the end user device;

receiving, at the server, information associated with a captured image of the subsequent graphical binding code; and determining, at the server, whether the binding of the VDI media client and the VDI host client is affirmed based on the received information associated with captured image of the subsequent graphical binding code.

10. A non-transitory computer readable medium having stored thereon instructions that, when executed by a processor, perform a method comprising:

receiving, at a server, enrollment information associated with a virtual desktop infrastructure (VDI) media client of an end user device across a communication network;

determining, by at least one processor of the server, that the VDI media client of the end user device is not bound together with a VDI host client;

providing a graphical binding code instruction to the VDI media client of the end user device;

receiving, at the server, information associated with a captured image of a graphical binding code;

determining, by the at least one processor of the server, whether the received information associated with the captured image of the graphical binding code allows for binding; and binding, via the server and in response to determining that the received information associated with the captured image of the graphical binding code allows for binding, the VDI media client of the end user device together with the VDI host client of the server.

11. The non-transitory computer readable medium of claim 10, wherein the enrollment information associated with the VDI media client of the end user device includes a binding code associated with an end user identification and password.

12. The non-transitory computer readable medium of claim 10, wherein VDI communications are separated into a media traffic channel and a signaling traffic channel, and wherein the VDI media client is configured to accommodate the media traffic channel and the VDI host client is configured to accommodate the signaling traffic.

13. The non-transitory computer readable medium of claim 10, wherein the graphical binding code is at least one of a quick response (QR) code, a barcode, a matrix barcode, and a machine-readable representation of data used to bind the VDI media client with the VDI host client, and wherein the graphical binding code instruction is at least partially configured to present the graphical binding code to an application window of a graphical user interface associated with the end user device.

14. The non-transitory computer readable medium of claim 13, wherein prior to receiving the captured image of the graphical binding code, the method further comprises:

initiating an image capture function of the end user device; and capturing an image of the presented graphical binding code.

15. The non-transitory computer readable medium of claim 14, wherein prior to capturing the image of the presented graphical binding code, the method further comprises:

determining an arrangement of one or more windows presented to the graphical user interface of the end user device;

providing an instruction to arrange the one or more windows when it is determined that the presented graphical binding code of the application window is not completely visible; and arranging, in response to the instruction, the one or more windows such that the graphical binding code is completely visible on the graphical user interface.

16. The non-transitory computer readable medium of claim 14, wherein capturing the image of the presented graphical binding code further comprises:

receiving an instruction at the end user device to perform an image capture of at least a portion of the graphical user interface, wherein the image capture is performed by an operating system of the end user device; and storing the captured image in a memory associated with the end user device.

17. The non-transitory computer readable medium of claim 10, wherein determining whether the received information associated with captured image of the graphical binding code allows for binding further comprises:

reading, by the server, the information associated with the captured image of the graphical binding code;

determining, by the server, whether a match exists between the read information associated with the captured image of the graphical binding code and data stored in a server memory; and allowing, by the server and where a match exists, for binding between the VDI media client and the VDI host client.

18. The non-transitory computer readable medium of claim 10, wherein the method further comprises:

receiving, at the server, an input to affirm the binding between the VDI media client and the VDI host client bound together;
providing a subsequent graphical binding code instruction to the end user device, wherein the subsequent graphical binding code instruction is at least partially configured to present a subsequent graphical binding code to the application window of the graphical user interface associated with the end user device;
receiving, at the server, information associated with a captured image of the subsequent graphical binding code; and
determining, at the server, whether the binding of the VDI media client of the end user device and the VDI host client is affirmed based on the received information associated with the captured image of the subsequent graphical binding code.

19. A contact center, comprising:
an end user device having a virtual desktop infrastructure (VDI) media client contained in a memory and executed by a processor of the end user device, the VDI media client configured to accommodate media traffic on a media traffic channel, wherein the end user device is configured to capture an image of a presented graphical binding code, and send information associated with the captured image of the graphical binding code across a communication network to at least one server;
a collaboration server in communication with a VDI server having a VDI host client contained in a VDI server memory and executed by at least one server processor, the VDI host client configured to accommodate signaling traffic on a signaling channel, wherein the collaboration server is configured to receive enrollment information associated with the end user device, determine that the VDI media client of the end user device is not bound together with the VDI host client, provide a graphical binding code instruction to the VDI media client of the end user device, receive information associated with the captured image of a graphical binding code, determine whether the received captured image of the graphical binding code allows for binding, and in response to determining that the received information associated with the captured image of the graphical binding code allows for binding, bind the VDI media client of the end user device together with the VDI host client on the VDI server; and
wherein VDI communications made by the end user device are separated into media traffic that is handled by the VDI media client on the end user device and signaling traffic that is handled by the VDI host client on the VDI server.

20. The contact center of claim 19, wherein determining whether the received information associated with the captured image of the graphical binding code allows for binding further comprises:
reading the information associated with the captured image of the graphical binding code;
determining whether a match exists between the read information associated with the captured image of the graphical binding code and data stored in a collaboration server memory; and
allowing, where a match exists, for binding between the VDI media client and the VDI host client.

* * * * *